United States Patent [19]

DiRocco et al.

[11] 4,285,382
[45] Aug. 25, 1981

[54] TIRE REPAIR PATCH

[76] Inventors: Jobbie DiRocco, 3424 Sweetbriar Ave., Akron, Ohio 44321; David J. DiRocco, 7090 Grove Rd., Clinton, Ohio 44216

[21] Appl. No.: 167,460

[22] Filed: Jul. 10, 1980

[51] Int. Cl.³ .................. B60C 21/02; B60C 21/04
[52] U.S. Cl. ............................. 152/367; 152/370; 156/97
[58] Field of Search ............ 156/94, 96, 97, 98; 152/367, 368, 369, 370, 371

[56] References Cited

U.S. PATENT DOCUMENTS

| 3,080,907 | 3/1963 | Barrett | 156/97 |
| 3,267,981 | 8/1966 | Bennies | 152/367 |
| 3,332,466 | 7/1967 | Wolfe | 152/367 |

FOREIGN PATENT DOCUMENTS 868380  5/1961  United Kingdom .................. 152/367

*Primary Examiner*—John E. Kittle
*Attorney, Agent, or Firm*—Frederick K. Lacher

[57] ABSTRACT

A tire repair patch having overlapping plies of reinforcing cords, a base cushion gum layer and an intermediate cushion gum layer positioned between at least two of the plies. The intermediate cushion gum layer has a thickness greater than the thickness of the plies and suspends some of the plies for distributing the forces transmitted through the patch at the injured portion of the tire.

14 Claims, 8 Drawing Figures

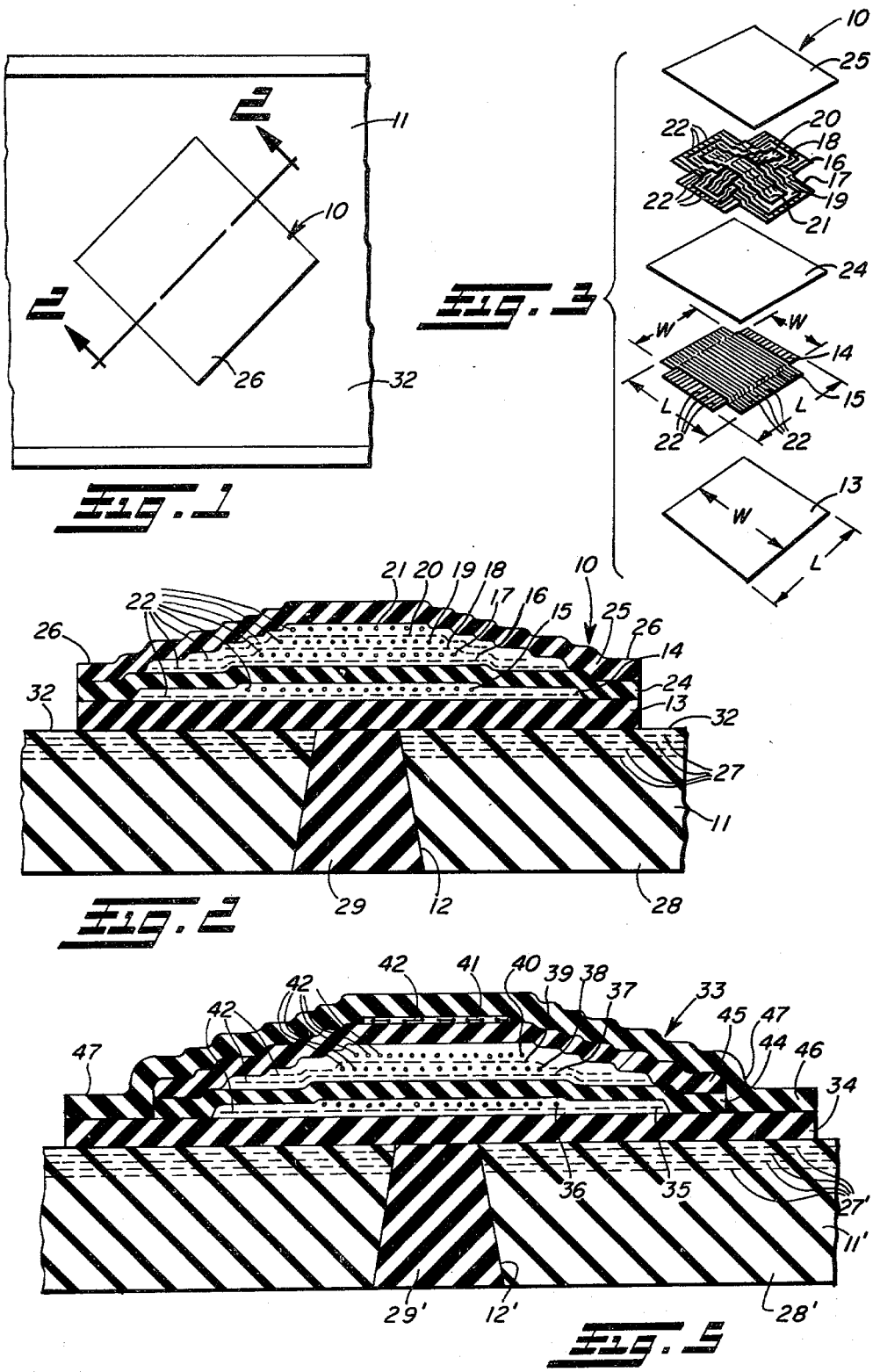

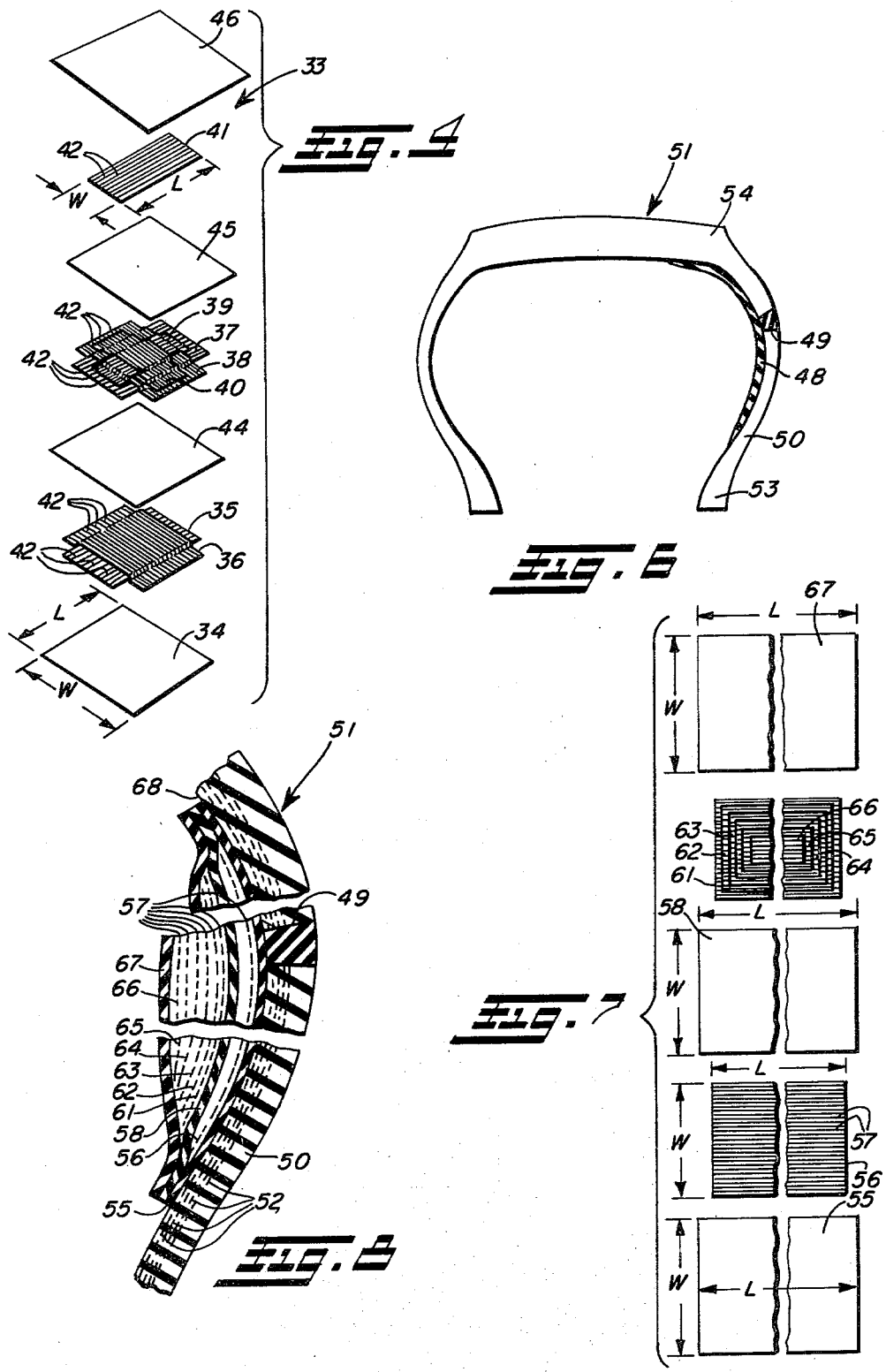

TIRE REPAIR PATCH

BACKGROUND OF THE INVENTION

In the past tires have been repaired by applying a patch over the damaged part of the tire at the inner surface of the tire. The hole or other break in the tire was filled with a plug of gum rubber. The type of patch used was a laminated build-up of cord plies which, when vulcanized to the tire, was relatively stiff and did not flex or move with the tire so that during operation of the tire there was edge cracking and breaking loose of the patch from the tire.

In an effort to overcome this problem tire patches have been made of different constructions including patches having overlapping parallel spaced cord plies, plies of different numbers of cords and kinds of textile material, rubber strips to cover the ends of the cords and plies of cords at different angles so that there would be less resistance to flexing and movement of the patch relative to the tire surface during operation. These proposed solutions have not been completely satisfactory because it has been difficult to make some of these patches without air spaces between the plies. The air spaces are very objectionable because the air expands as the tire temperature increases and can cause premature failure of the patch and tire. In other cases the patches have not provided the desired flexibility to prevent edge cracking and breaking loose of the patch from the tire.

SUMMARY OF THE INVENTION

The present invention is directed to a tire patch construction which has the flexibility and resilience to flex with the tire in operation and at the same time can be built without the formation of air spaces. This is accomplished by providing a relatively thick intermediate cushion gum layer of rubber at a position spaced from the tire-engaging surface of the patch and interposed between at least two of the plies. The patch also has a relatively thick base cushion gum layer of rubber at the surface engageable with the inner surface of the tire. With this construction the patch is given a flexibility and resilience which resists edge cracking and breaking loose of the edges from the tire during operation.

One or two layers of reinforcing cords or working plies are suspended from the tire plies and also from the main body of reinforcing plies of the tire patch on relatively thick layers of rubber so that there can be flexing of the working plies with the reinforcing plies of the tire and with the body plies of the patch. The interaction of the intermediate cushion gum suspension layer, the base cushion gum layer and where used, the top cushion gum layer with the working plies and body plies reduces the stress at the edges of the patch and thereby reduces the forces which have caused the patch edges to crack and break away from the tire. This results in a longer life of the patch and tire. The invention may be incorporated in patches for bias ply and radial tires.

To the accomplishment of the foregoing and related ends, the invention, then, comprises the features hereinafter fully described and particularly pointed out in the claims, the following description and annexed drawings setting forth in detail certain illustrative embodiments of the invention, these being indicative, however, of but several of the various ways in which the principles of the invention may be employed.

BRIEF DESCRIPTION OF THE DRAWINGS

FIG. 1 is a fragmentary view of the inside of a tire showing the tire repair patch bonded to the inner surface of the tire.

FIG. 2 is an enlarged fragmentary sectional view of the tire repair patch of FIG. 1 taken on line 2—2 of FIG. 1.

FIG. 3 is an exploded view illustrating the laminated construction of the tire repair patch of FIG. 1.

FIG. 4 is an exploded view showing the construction of a modification of a tire repair patch embodying the invention.

FIG. 5 is an enlarged fragmentary sectional view like FIG. 2 of the tire repair patch of FIG. 4.

FIG. 6 is a schematic sectional view of a radial tire showing another modification of the tire repair patch embodying the invention bonded to the inner surface of a sidewall of the radial tire.

FIG. 7 is an exploded view illustrating the construction of the tire repair patch of FIG. 6 with parts being broken away.

FIG. 8 is an enlarged detailed sectional view of the patch of FIG. 6 with parts being broken away showing the relationship of reinforcing plies and cushion gum layers to the reinforcing plies of the tire.

DETAILED DESCRIPTION

Referring to FIGS. 1 and 2, a tire repair patch 10 is shown bonded to a tire 11 having an injury 12 which may be a break or puncture in the wall of the tire. With reference to FIGS. 2 and 3, the patch 10 is of a laminated construction including a base cushion gum layer 13, plies 14, 15, 16, 17, 18, 19, 20 and 21 of reinforcing cords 22, an intermediate cushion gum layer 24 and a top cushion gum layer 25.

In the embodiment shown, the plies 14 through 21 of reinforcing cords are of nylon and may have from ten to forty ends per inch and be of a 2200 denier. Alternatively, the cords 22 may be of nylon, polyester, polyamides or wire. The cords 22 of the plies 14 through 21 may have a skim coat of rubber such as natural or SBR rubber applied as by calendering and have a thickness of from 0.018 to 0.025 inches with a calendered thickness of from 0.023 to 0.035 inches. Alternatively the cords may be coated with reclaim, a blend of natural and SBR or a blend of natural, reclaim and SBR rubbers.

The plies 14 through 21 are preferably elongated strips of reinforcing cords 22 which extend substantially longitudinally of the strips. The plies 14 through 21 are in criss-cross relationship with the cords 22 of adjacent plies positioned at substantially right angles. Also the larger plies are closer to the base cushion gum layer 13 and the smaller plies are closer to the top cushion gum layer 25. As shown in FIG. 3, the base cushion gum layer 13 has a width W of twelve inches and a length L of twelve inches. Overlying the base cushion gum layer 13 is a pair of plies 14 and 15 in criss-cross relationship, each of which has a width W of nine inches and a length L of eleven inches. These plies 14 and 15 are designated as being working plies because they are separated from the other plies 16 through 21 by the intermediate cushion gum layer 24 which has the same width and length as the base cushion gum layer 13. As shown in FIG. 2, the intermediate cushion gum layer 24 extends continuously between the end portions of the working plies 14 and 15. Overlying the intermediate cushion gum layer 24 is a pair of plies 16 and 17 in criss-cross relationship, each of which has a width of eight inches and a length of ten inches. These plies are overlapped by another pair of plies 17 and 18 in criss-cross relationship, each of which has a width of seven inches and a length of nine inches.

Overlying these plies is another pair of plies 20 and 21 in criss-cross relationship, each of which has a width of six inches and a length of eight inches. These plies 16 through 21 which overlie the intermediate cushion gum layer 24 are designated as the body plies and provide a substantial amount of the reinforcing strength of the patch 10.

Overlying the body plies 16 through 21 is the top cushion gum layer 25 which has the same size as the base and intermediate cushion gum layers 13 and 24. Although it is desirable to have this layer 25 for this patch 10, it is understood that in some cases this layer may not be necessary such as when the patch is cured with a mandrel-type mold.

The base, intermediate and top cushion gum layers 13, 24 and 25 are preferably of a resilient rubberlike material such as natural rubber and alternatively of SBR rubber, a blend of natural and SBR rubbers, or a blend or polybutadienes having a thickness greater than the thickness of any of the plies 14 through 21. In the embodiment shown the base cushion gum layer 13 has a thickness of 0.090 inches. The intermediate cushion gum layer 24 has a thickness of 0.060 inches and the top cushion gum layer 25 has a thickness of 0.060 inches. The edges of the base, intermediate and top cushion gum layers 13, 24 and 25 overlap at an edge portion 26 to provide a cushioning edge of the patch 10. The base, intermediate and top cushion gum layers 13, 24 and 25 are referred to as separate layers from the plies 14 through 21; however, in the fabrication of the patch 10 it is understood that these layers may be applied by calendering or laminating them to one or more of the reinforcing plies without departing from the spirit or scope of the invention.

The intermediate cushion gum layer 24 suspends the working plies 14 and 15 between the wall of the tire 11 and the body plies 16 through 21 and may have a thickness of 0.010 up to 0.0250 inches depending upon the service requirements of the patch. As shown in FIG. 2, the tire 11 has reinforcing plies 27 and a tread portion 28. A plug 29 of resilient rubberlike material such as natural or SBR rubber is inserted at the injury 12 of the tire 11 which has been skived with a V-shaped taper as shown in FIG. 2.

The intermediate cushion gum layer 24 is preferably of a resilient rubberlike material having a tensile strength of about 2800 pounds per square inch but may be from 2600 to 3000 pounds per square inch. This material has a modulus of elasticity of about 1000 to 1200 and may be as high as 1400. The hardness of the material is preferably about 50 durometer but may be from 48 to 60 durometer. The base cushion gum layer 13 and top cushion gum layer 25 may be of this same material although this is not essential for effective operation of the patch.

The tire repair patch 10 may be built in the uncured condition and compressed by suitable means such as rolling so that substantially no air remains in the patch. The base, intermediate and top cushion gum layers 13, 24 and 25 and the plies 14 through 21 will be held together by the natural tack of the rubber in the patch 10. The patch 10 is then covered by polyethylene or some other material which can be removed when the patch is to be used.

The application of the patch 10 to the tire 11 follows the procedure well known to those skilled in the art wherein an inner surface 32 of the tire 10 around the injury 12 is cleaned and buffed. A patch 10 of an appropriate size is selected and the repair finished by using either the heat vulcanizing method, the semicure method or the chemical cure method. In the heat vulcanizing method, the protective film is removed from the patch 10 and the patch installed with no distortion and stitched thoroughly from the center to the edges. The tire 11 is then placed in a section mold or kettle and the patch 10 cured in a conventional approved manner.

In the semicured method, the patch 10 is cured before application to the tire 11. Then a layer of rubber which may be part of the base cushion gum layer 13 is cured in a kettle or mold or is cured with a chemical cement. In the chemical cure method, a patch 10 is cured and has a layer of chemical cure base gum which may be molded or laminated to the patch 10. When it is desired to apply the patch 10 to the inner surface 32 of the tire 11, a chemical cement-like vulcanizing material is added to the base cushion gum layer 13 and the patch applied to the inner surface of the tire. The curing of the chemical cure base gum will take place at room temperature and may be accelerated by the addition of heat.

With this construction it has been found that there is substantially no edge cracking and it is believed that this is due to the interaction of the intermediate cushion gum layer 24 with the working plies 14 and 15 to transfer the forces from the reinforcing plies 27 of the tire 11 to the body plies 16 through 21 and at the same time distribute the stresses and absorb the shocks during operation of the tire with the patch 10 adhered thereto.

Referring to FIGS. 4 and 5, a modified form of the invention is shown in which a patch 33 has a base cushion gum layer 34, overlapping plies 35 through 41 of reinforcing cords 42, a first intermediate cushion gum layer 44, a second intermediate cushion gum layer 45 and a top cushion gum layer 46. The reinforcing cords 42 of the plies 35 through 41 may be of the same end count and materials as those described hereinabove for plies 14 through 21 of the patch 10 shown in FIGS. 1 through 3. Also the thickness and materials of the base, first intermediate, second intermediate and top cushion gum layers 34, 44, 45 and 46 may be the same as the thickness and materials of the base, intermediate and top cushion gum layers 13, 24 and 25 of the patch 10 shown in FIGS. 1 through 3.

In this modification, as shown more clearly in FIG. 4, the base cushion gum layer 34 has a width W of twelve inches and a length L of twelve inches. Overlying the base cushion gum layer 34 is a pair of working plies 35 and 36 in criss-cross relationship, each of which has a length of eleven inches and a width of nine inches. Overlying the working plies 35 and 36 is the first intermediate cushion gum layer 44 having a width of eleven and one-half inches and a length of eleven and one-half inches. Overlying the first intermediate cushion gum layer 44 is a pair of body plies 37 and 38 in criss-cross relationship, each of which has a width of eight inches and a length of ten inches. Overlying this pair of body plies 37 and 38 is another pair of body plies 39 and 40 in criss-cross relationship, each of which has a width of seven inches and a length of nine inches. Overlying these body plies 39 and 40 is the second intermediate cushion gum layer 45 having a width of eleven and one-half inches and a length of eleven and one-half inches. Then overlying the second intermediate cushion gum layer 45 is a single reinforcing ply 41 having a width of six inches and a length of eight inches. Finally, overlying the reinforcing ply 41 is the top cushion gum layer 46 having a width of twelve inches and a length of twelve inches. The top layer 46 is preferred; however, it may not be necessary for other patches such as those cured with a mandrel-type mold. From FIG. 5 it can be seen that the first and second intermediate cushion gum layers 44 and 45 overlap in an edge portion 47 of the patch 33 at a position beyond the ends of the plies 35 through 41. Also the top cushion gum layer 46 and base cushion gum layer 34 overlap in the edge portion at positions beyond the ends of the first and second intermediate cushion gum layers 44 and 45.

The patch 33 of this modification is made in substantially the same way described for the patch 10 of FIGS. 1 through 3 and may be applied to a tire 11' with reinforcing plies 27' over an injury 12' in which a plug 29' has been inserted in a skived opening of the tire. With this construction, the working plies 35 and 36 are suspended between the reinforcing plies 27' of the tire 11' and the body plies 36 through 40 of the patch 10. Also the top ply 41 is suspended between the top cushion gum layer 46 and the body plies 37 through 40 to further distribute the load and reduce the stresses at the edge portions 47 of the patch 33. Furthermore, the positioning of the edges of the first and second intermediate cushion gum layers 44 and 45 and the base and top cushion gum layers 34 and 46 provides a resilient edge of the patch 33 which cushions the patch. In this way the forces in the tire 11' carried by the reinforcing plies 27' are transmitted to the body plies 37 through 40 of the patch 33.

Referring to FIGS. 6, 7 and 8, another modification is shown in which a tire repair patch 48 is adapted for repairing an injury 49 in the sidewall 50 of a radial tire 51. Reinforcing plies 52 of the tire 51, as shown in FIG. 8, extend generally in a radial direction between the bead portion 53 and tread 54 of the tire. As shown in FIGS. 7 and 8, the tire repair patch 48 is built up of a base cushion gum layer 55 which has a length L of twenty-seven inches substantially equal to the distance between the bead portion 53 and tread 54 of the tire 51 and a width W of nine and one-half inches required to cover the injury 49. Overlying the base cushion gum layer 55 is a working ply 56 having reinforcing cords 57 extending lengthwise and a length of twenty-six inches and width of eight and one-half inches. Overlying the working ply 56 is an intermediate cushion gum layer 58 having substantially the same size as the base cushion gum layer 55.

Overlying the intermediate cushion gum layer 58 is a first body ply 61 having a length of twenty-five inches and a width of eight inches. Overlying the first body ply 61 is a second body ply 62 having a length of twenty-four inches and a width of seven and one-half inches. Overlying the second body ply 62 is a third body ply 63 having a length of twenty-three inches and a width of seven inches. Overlying the third body ply 63 is a fourth body ply 64 having a length of twenty-two inches and a width of six and one-half inches. Overlying the fourth body ply 64 is a fifth body ply 65 having a length of twenty-one inches and a width of six inches. Overlying the fifth body ply 65 is a sixth body ply 66 having a length of twenty inches and a width of five and one-half inches. As shown in FIGS. 7 and 8, all of the cords 57 of the working ply 56 and body plies 61 through 66 extend in the same direction. A top cushion gum layer 67 overlies the body plies 61 through 66 and has a width and length the same as the width and length of the base and intermediate cushion gum layers 55 and 58.

As shown in FIG. 8, the tire repair patch 48 is applied to the sidewall 50 with the cords 57 extending substantially in the same direction as the cords of the tire reinforcing plies 52. The cords 57 of plies 56 and 61 through 66 may be of the same size and material as described for the patch 10 of FIGS. 1 through 3 and the base, intermediate and top cushion gum layers 55, 58 and 67 may also be of the same thickness and material as these elements are in the cushion gum layers of the patch 10 shown in FIGS. 1 through 3. The tire repair patch 48 may also be built and applied to an inner surface 68 of the radial tire 51 in a similar manner to that described for the application and preparation of the tire repair patch 10 of FIGS. 1 through 3.

It is understood that other tire repair patch constructions in accordance with this invention may be provided in which the number of plies may be increased or decreased depending upon the strength required of the patch. Also the intermediate cushion gum layer may be disposed at other positions and have a greater or lesser thickness to suspend the working plies and cushion the patch.

While certain representative embodiments and details have been shown for the purpose of demonstrating the invention, it will be apparent to those skilled in the art that various changes and modifications may be made therein without departing from the spirit or scope of the invention.

We claim:

1. A tire repair patch for application to the inner surface of a tire at an injured portion comprising a plurality of overlapping plies of reinforcing cords and at least some of said plies having overlapping end portions, a base cushion gum layer underlying said plies at said underside for engagement with said inner surface of the tire, a top cushion gum layer overlying said plies at the opposite side of the patch from said underside, an intermediate cushion gum layer interposed between at least two of said plies of reinforcing cords, each of said overlapping plies being coated with rubber and having a thickness less than the thickness of said intermediate cushion gum layer, said intermediate cushion gum layer extending continuously between said overlapping end portions of at least two of said reinforcing plies, said base cushion gum layer being adapted for adherence to the inner surface of the tire to provide reinforcement of the tire in the area of said patch, and said reinforcing plies interposed between said base cushion gum layer and said intermediate cushion gum layer interacting with the remainder of said plies and said base and top cushion gum layers for distributing the forces transmitted through said patch at the injured portion of the tire.

2. The tire repair patch of claim 1 wherein said plies of reinforcing plies further comprise working plies and body plies, said working plies being positioned between said base cushion gum layer and said intermediate cushion gum layer and said body plies being positioned between said intermediate cushion gum layer and said top cushion gum layer.

3. The tire repair patch of claim 2 wherein said working plies include two elongated overlapping plies with each of said plies having cords extending longitudinally of the ply and being positioned at substantially right angles to the cords of the other of said working plies.

4. The tire repair patch of claim 3 wherein said body plies include at least one pair of elongated overlapping plies of reinforcing cords and each of said plies having cords extending longitudinally of the ply and being positioned at substantially right angles to the cords of the other of said pair of body plies.

5. The tire repair patch of claim 4 wherein said body plies include at least two pair of said elongated plies.

6. The tire repair patch of claim 1 wherein said top cushion gum layer, said intermediate cushion gum layer and said base cushion gum layer extend beyond said plies of reinforcing cords and have edges bonded together to form a cushioning edge for said patch.

7. The tire repair patch of claim 1 wherein a second intermediate cushion gum layer is interposed between two of said plies at a position spaced from said first-mentioned intermediate cushion gum layer by at least one of said plies, each of said overlapping plies of reinforcing cords having a thickness less than the thickness of said second intermediate cushion gum layer so that said second intermediate cushion gum layer will further interact with said cushion gum layers for distributing the forces transmitted through said patch.

8. The tire repair patch of claim 7 wherein said second intermediate cushion gum layer is spaced from said top cushion gum layer by at least one of said plies and said first-mentioned cushion gum layer is spaced from said base cushion gum layer by at least two of said plies.

9. The tire repair patch of claim 8 wherein said first-mentioned intermediate cushion gum layer and said second intermediate cushion gum layer are spaced apart by at least four of said plies.

10. The tire repair patch of claim 7 wherein said first-mentioned and second intermediate cushion gum layers extend beyond the edges of said plies and are bonded together at an edge portion of said patch.

11. The tire repair patch of claim 10 wherein said base and top cushion gum layers extend beyond the edges of said first-mentioned and second intermediate cushion gum layers and are bonded together at said edge portion.

12. A tire repair patch for application to the inner surface of a tire at an injured portion comprising a plurality of overlapping plies of reinforcing cords and at least some of said plies having overlapping end portions, a base cushion gum layer underlying said plies at said underside for engagement with said inner surface of the tire, an intermediate cushion gum layer interposed between at least two of said plies of reinforcing cords, each of said overlapping plies being coated with rubber and having a thickness less than the thickness of said intermediate cushion gum layer, said intermediate cushion gum layer extending continuously between said overlapping end portions of at least two of said reinforcing plies, said base cushion gum layer being adapted for adherence to the inner surface of the tire to provide reinforcement of the tire in the area of said patch, and said reinforcing plies interposed between said base cushion gum layer and said intermediate cushion gum layer interacting with the remainder of said plies and said base cushion gum layer for distributing the forces transmitted through said patch at the injured portion of the tire.

13. The tire repair patch of claim 12 wherein each of said overlapping plies further comprise cords extending substantially in the same direction as the cords of adjacent plies for positioning of said patch on a radial tire with the cords of said plies extending substantially in the same direction as the cords of the tire reinforcing plies.

14. The tire repair patch of claim 13 wherein said plies adjacent to said base cushion gum layer are larger than said plies spaced from said base cushion gum layer and said base and intermediate cushion gum layers extend beyond the edges of said plies and are bonded together at an edge portion of said patch.

* * * * *